US011922864B2

(12) United States Patent
Wu (10) Patent No.: US 11,922,864 B2
(45) Date of Patent: Mar. 5, 2024

(54) DISPLAY DEVICE

(71) Applicant: XIAMEN XM-PLUS TECHNOLOGY CO., LTD, Fujian (CN)

(72) Inventor: Che-Wei Wu, Fujian (CN)

(73) Assignee: XIAMEN XM-PLUS TECHNOLOGY CO., LTD, Fujian (CN)

( * ) Notice: Subject to any disclaimer, the term of this patent is extended or adjusted under 35 U.S.C. 154(b) by 0 days.

(21) Appl. No.: 18/117,490

(22) Filed: Mar. 6, 2023

(65) Prior Publication Data

US 2023/0343274 A1 Oct. 26, 2023

(30) Foreign Application Priority Data

Apr. 21, 2022 (CN) .......................... 202210422489.6

(51) Int. Cl.
*G09G 3/32* (2016.01)
*G09G 3/20* (2006.01)

(52) U.S. Cl.
CPC .............. *G09G 3/32* (2013.01); *G09G 3/2096* (2013.01); *G09G 2310/0267* (2013.01); *G09G 2310/08* (2013.01); *G09G 2320/0633* (2013.01); *G09G 2320/064* (2013.01); *G09G 2320/0693* (2013.01); *G09G 2330/021* (2013.01); *G09G 2330/08* (2013.01); *G09G 2340/00* (2013.01)

(58) Field of Classification Search
None
See application file for complete search history.

(56) References Cited

U.S. PATENT DOCUMENTS

2015/0339967 A1\* 11/2015 Shin ..................... G09G 3/2003
345/690

\* cited by examiner

*Primary Examiner* — Christopher J Kohlman
(74) *Attorney, Agent, or Firm* — Yue (Robert) Xu; Apex Attorneys at Law, LLP (57) ABSTRACT

A display device includes a controller, a power management circuit and N display modules. Each of the N display modules includes M driving circuits, and M display arrays respectively connected to the M driving circuits. Each of the M driving circuits is configured to drive a display array connected to the driving circuit, and each of the display arrays includes at least one indicator light. The power management circuit is configured to output a voltage determined by the voltage control signal to the display arrays to supply power to the display array. M driving circuits in each of the display modules are cascaded through serial control lines. The controller is configured to address M driving circuits and read data of M driving circuits through the serial control lines, and send information to the driving circuits through the sharing data line to control the driving circuits and the indicator light.

12 Claims, 8 Drawing Sheets

DISPLAY DEVICE

CROSS REFERENCE OF RELATED APPLICATION

The present application claims priority to Chinese Patent Application No. 202210422489.6, titled "DISPLAY DEVICE", filed on Apr. 21, 2022 with the China National Intellectual Property Administration, which is incorporated herein by reference in its entirety.

FIELD

The present disclosure relates to the technical field of circuits, and in particular to a display device.

BACKGROUND

In recent years, a display device with distributed drivers is widely applied. For example, a common distributed LED display device performs IC addressing and configuration and controls an operation mode through a public command line and a serial communication line. The circuit design and the data transmission of the display device are complicated.

In summary, how to effectively achieve a distributed display device and reduce the complexities of the circuit design and the data transmission is a technical problem to be urgently solved by those skilled in the art.

SUMMARY

A display device is provided according to the present disclosure, to effectively achieve a distributed display device and reduce the complexities of the circuit design and the data transmission.

In order to solve the above technical problem, the following technical solutions are provided according to the present disclosure.

A display device includes: a controller, a power management circuit and N display modules.

Each of the N display modules includes M driving circuits, and M display array sets respectively connected to the M driving circuits, each of the M driving circuits is configured to drive a display array set connected to the driving circuit, and each of the display array sets includes at least one display array, the display array comprises at least one indicator light, and M and N each represent a positive integer.

The power management circuit is connected to the controller and respective display array sets; and is configured to receive a voltage control signal sent by the controller, and output a voltage determined by the voltage control signal to the display array sets to supply power to the display array sets.

For each of the N display modules, M driving circuits in the display module are cascaded through serial control lines corresponding to the display module, and connected to a corresponding IO port of the controller through the serial control line; and the M driving circuits in the display module are connected to the controller through a sharing data line corresponding to the display module.

The controller is configured to address the M driving circuits in each of the display modules and read data of M driving circuits in each of the display modules, through the serial control lines corresponding to the display module, and send information to the driving circuits in the display module through the sharing data line corresponding to the display module, to control the driving circuits and the indicator lights; and data is distinguished by different duty cycles on each sharing data line.

In an embodiment, the display device further includes a scanning driving circuit, and each of the display array sets comprises multiple display arrays.

In each of the display modules, each of driving circuits is connected to K display arrays and is configured to drive the K display arrays, and K represents a positive integer greater than or equal to 2.

The scanning driving circuit is connected to the power management circuit, the controller and the respective display arrays; and is configured to receive power from the power management circuit, determine a scanning timing sequence based on a scanning control signal outputted by the controller, and cyclically output the voltage determined by the voltage control signal through K output terminals in a sequence, to cyclically supply power to the K display arrays connected to each driving circuit.

In an embodiment, a type of information transmitted on each sharing data line comprises a data packet and a command packet, the data packet includes SoT, CID, DW and DATA, and the command packet includes SoT, CID, CW and CMD.

SoT represents set data of start of transmission, CID represents an identity of an object specified by a packet, CW represents a set command flag, DW represents a set data flag, CMD represents command content of the command packet, and DATA represents data content of the data packet.

In an embodiment, when the controller is configured to read data of the M driving circuits in each of the display modules through the serial control lines corresponding to the display module, the controller is further configured to: for each of the display modules, read data of the M driving circuits in the display module through the serial control lines corresponding to the display module, in an order of the first driving circuit to the M-th driving circuit in the display module or in an order of the M-th driving circuit to the first driving circuit in the display module, in a case that a data reading command is written to the sharing data line corresponding to the display module.

In an embodiment, when the controller is configured to address M driving circuits in each of the display modules through the serial control lines corresponding to the display module, the controller is further configured to:

for each of the display modules, address the M driving circuits in the display module, in an order of the first driving circuit to the M-th driving circuit in the display module or in an order of the M-th driving circuit to the first driving circuit in the display module; and for each of the driving circuits, determine an address carried in an address packet as an address assigned for the driving circuit and store the address, in a case that the driving circuit receives a pulse signal through a serial control line connected to the driving circuit and receives an address packet through a sharing data line connected to the driving circuit, where the address packet includes a packet header in a predetermined format and the address.

In an embodiment, each of the driving circuits includes:

a serial input and output interface configured to connect the serial control lines and the sharing data line, where the controller addresses the driving circuit and reads data of the driving circuit through the serial control lines, and the controller sends information to the driving circuit through the sharing data line;

a timing sequence controller connected to the serial input and output interface, and configured to decode and deserialize data, store the decoded and deserialized data in a first storage unit; and control outputs of a pulse amplitude modulation unit and a pulse width modulation unit through the data stored in the first storage unit, to control the respective indicator lights connected to the driving circuit;

the first storage unit connected to the timing sequence controller, and configured to store data;

a second storage unit connected to the timing sequence controller, and configured to store an address;

the pulse amplitude modulation unit connected to the timing sequence controller, and configured to output Y PAM signals under a control of the timing sequence controller;

the pulse width modulation unit connected to the timing sequence controller, and configured to output Y PWM signals under the control of the timing sequence controller;

a current source driver with an adjustable gain, connected to the pulse amplitude modulation unit and the pulse width modulation unit, and configured to output Y current driving signals under a control of the Y PAM signals and the Y PWM signals to drive the display array set connected to the driving circuit, where a power of each of the current driving signals is controlled by one PAM signal and one PWM signal that correspond to the current driving signal; and a channel status monitoring circuit configured to monitor circuit information of the Y current driving signals.

In an embodiment, the current source driver with the adjustable gain is specifically configured to:

determine a global setting of currents of Y current sources through a first current adjustment command, and determine respective currents of the Y current sources through Y second current adjustment commands to perform a current calibration; and output the Y current driving signals under the control of the Y PAM signals and the Y PWM signals, to drive the display array set connected to the driving circuit, where the power of each of the current driving signals is controlled by one PAM signal and one PWM signal that correspond to the current driving signal.

In an embodiment, the controller is further configured to: read circuit information monitored by respective channel status monitoring circuits, and adjust an output voltage of the power management circuit to a minimum power supply voltage required by the respective display array sets.

In an embodiment, the controller is further configured to: adjust monitoring modes of the channel status monitoring circuits through a monitoring mode adjusting command, where an adjustable item of the monitoring mode includes a first adjustable item for indicating monitoring of a trigger time, where the monitoring of the trigger time includes periodic monitoring, monitoring on receipt of a monitoring command, and monitoring when the monitoring command is received and the display device is in a standby status; a second adjustable item for indicating a duration in which the monitoring is performed once; and a third adjustable item for indicating a selection of a monitored circuit.

In an embodiment, the controller is further configured to: read circuit information monitored by the respective channel status monitoring circuits, and calibrate a brightness of the display device to obtain a brightness calibration result; and send information to the respective driving circuits in each of the display modules through the sharing data line corresponding to the display module based on the brightness calibration result, to calibrate brightness of the respective indicator lights.

In an embodiment, the controller is further configured to: read circuit information monitored by the respective channel status monitoring circuits, and perform fault detection to acquire a fault detection result.

In an embodiment, the controller is further configured to: send a low power consumption command to the respective driving circuits in each of the display modules through the sharing data line corresponding to the display module, to set values of the current driving signals as zero.

According to the technical solutions of the embodiment of the present disclosure, the power management circuit 20 is connected to the controller 10 and the respective display arrays, and is configured to receive a voltage control signal sent by the controller 10 and output a voltage specified by the voltage control signal to each of the display arrays to supply power to each of the display arrays. Each of the display modules 30 includes: M driving circuits, and M display arrays respectively connected to the M driving circuits. Each of the M driving circuits is configured to drive a display array connected to the driving circuit. Each of the display arrays includes at least one indicator light. Therefore, according to the technical solutions of the present disclosure, a distributed display device can be achieved. The power management circuit may supply power to the respective display arrays under the control of the controller 10. For each of the display modules 30, M driving circuits in the display module 30 are cascaded through serial control lines corresponding to the display module 30. For each of the display modules 30, the controller 10 may address respective driving circuits in the display module 30 and read data of the respective driving circuits in the display module 30, through the serial control lines corresponding to the display module 30. Therefore, the addressing the driving circuits in the display device and reading data of the driving circuits in the display device can be easily achieved through the serial control lines, and the circuit design is simple. In the technical solutions of the present disclosure, when the controller 10 sends information to the respective driving circuits in each of the display modules 30 through the sharing data line corresponding to the display module 30, data is distinguished by different duty cycles on the sharing data line. Thus, only N sharing data lines are required to send information to N display modules 30, so that the circuit design is simple, and the complexity of the data transmission is reduced. In summary, the distributed display device can be effectively achieved according to the present disclosure, and complexities of circuit design and the data transmission of the display device are reduced.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

A display device is provided according to the present disclosure, to effectively achieve a distributed display device and reduce the complexities of the circuit design and the data transmission.

In order to enable those skilled in the art to better understand the solution of the present disclosure, the present disclosure is further described in detail below with reference to the drawings and specific embodiments. It is apparent that the embodiments described herein are merely some rather than all of embodiments of the present disclosure. Based on the embodiments of the present disclosure, all other embodiments obtained by those skilled in the art without any creative work should fall within the protection scope of the present disclosure.

Figure 1:
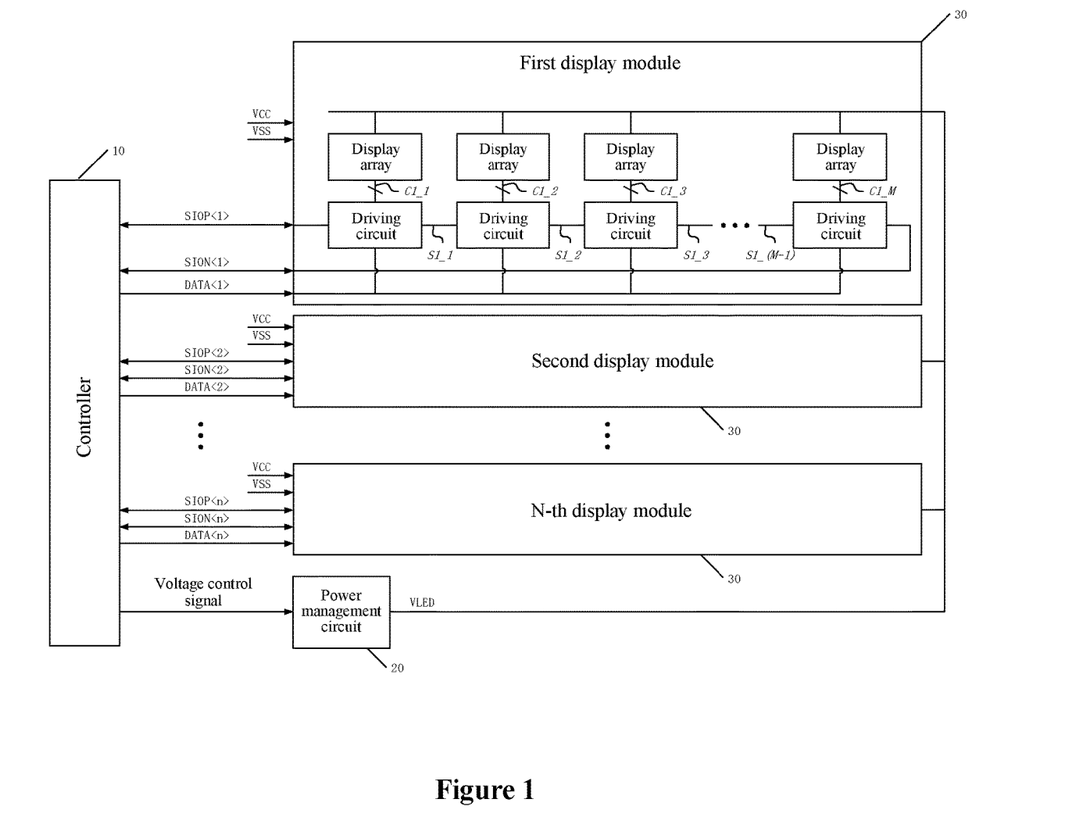
FIG. 1 is a schematic structural diagram of a display device according to an embodiment of the present disclosure.

Reference is made to FIG. 1, which is a schematic structural diagram of a display device according to an embodiment of the present disclosure. The display device may include a controller 10, a power management circuit 20 and N display modules 30.

Each of the display modules 30 includes M driving circuits, and M display arrays respectively connected to the M driving circuits. Each of the M driving circuits is configured to drive a display array connected to the driving circuit. Each of the display arrays includes at least one indicator light. M and N each represent a positive integer.

The power management circuit 20 is connected to the controller 10 and the respective display arrays, and is configured to receive a voltage control signal sent by the controller 10 and output a voltage specified by the voltage control signal to the respective display arrays to supply power to the display arrays.

For each of the display modules 30, M driving circuits in the display module 30 are cascaded through serial control lines corresponding to the display module 30, and connected to corresponding IO ports of the controller 10 through the serial control lines. In addition, the M driving circuits in the display module 30 are connected to the controller 10 through a sharing data line corresponding to the display module 30.

The controller 10 is configured to address M driving circuits in the display module 30 and read data of M driving circuits in the display module 30 through the serial control lines corresponding to the display module, and send information to the respective driving circuits in the display module 30 through the sharing data line corresponding to the display module 30, to control the respective driving circuits and the indicator lights. Data is distinguished by different duty cycles on each sharing data line.

In the solution of the present disclosure, since data may be distinguished by different duty cycles on each sharing data line, the controller 10 needs to have a duty cycle encoding function. The controller 10 may respectively provide control commands and display data to the N display modules 30 through N sharing data lines. DATA<1> to DATA<n> as shown in FIG. 1 represent the N sharing data lines, which are respectively connected to the N display modules 30.

Each display array includes at least one indicator light. A type of the indicator light may be determined as required, which may be set as an LED indicator light. The following of the present disclosure is described by taking the LED indicator light as an example.

The voltage control signal outputted by the controller 10 to the power management circuit 20 is used to specify a voltage outputted by the power management circuit 20, that is, a value of a signal VLED as shown in FIG. 1. For each of the display arrays, an anode of the LED indicator light of the display array is connected to the VLED, and a cathode of the LED indicator light is grounded. The LED indicator light generates brightness through a voltage drop supplied by the signal VLED. Each of the driving circuits is provided with a power terminal VCC and a ground terminal VSS as shown in FIG. 1.

For each of the display modules 30, M driving circuits in the display module 30 are cascaded through serial control lines corresponding to the display module 30. Taking a first display module 30 as shown in FIG. 1 as an example, M driving circuits in the first display module 30 are required to be provided with serial input and output interfaces for cascading, and a serial port for connecting a previous stage circuit is defined as a P terminal, and a serial port for connecting a post stage circuit is defined as an N terminal. In the first display module 30 as shown in FIG. 1, for example, a driving circuit closest to the controller 10 is defined as a first driving circuit. Accordingly, a driving circuit farthest from the controller 10 is defined as an M-th driving circuit. A P terminal of the first driving circuit is connected to the controller 10, and a circuit connecting the P terminal of the first driving circuit to the controller 10 is represented as SIOP<1>. An N terminal of the M-th driving circuit is connected to the controller 10, and a circuit connecting the N terminal of the M-th driving circuit to the controller 10 is represented as SION<1>. An N terminal of the first driving circuit is connected to a P terminal of a post stage circuit, that is, the N terminal of the first driving circuit is connected to the P terminal of the second driving circuit. A circuit connecting the N terminal of the first driving circuit to the P terminal of the second driving circuit is represented as S1_1. Similarly, an N terminal of the second driving circuit is connected to a P terminal of the third driving circuit, and a circuit connecting the N terminal of the second driving circuit to the P terminal of the third driving circuit is represented as S1_2. An N terminal of an M−1 driving circuit is connected to a P terminal of the M-th driving circuit, and a circuit connecting the N terminal of the M−1 driving circuit to the P terminal of the M-th driving circuit is represented as S1_(M−1).

The controller 10 is configured to address M driving circuits in the display module 30 and read data of the M driving circuits in the display module 30 through the serial control lines corresponding to the display module, that is, addressing and a read-back function can be achieved through SIOP and SION.

The M driving circuits are respectively connected to M display arrays. Each driving circuit may provide one or more channels of outputting current, to drive the corresponding number of indicator lights. Normally, driving control is implemented by controlling corresponding switch transistors to be on or off. As shown in FIG. 1, the first driving circuit is configured to drive a first display array, and a circuit connecting the first driving circuit to the first display array is represented as C1_1. Correspondingly, the M-th driving circuit is configured to drive an M-th display array, and a circuit connecting the M-th driving circuit to the M-th display array is represented as C1_M.

Figure 2A:
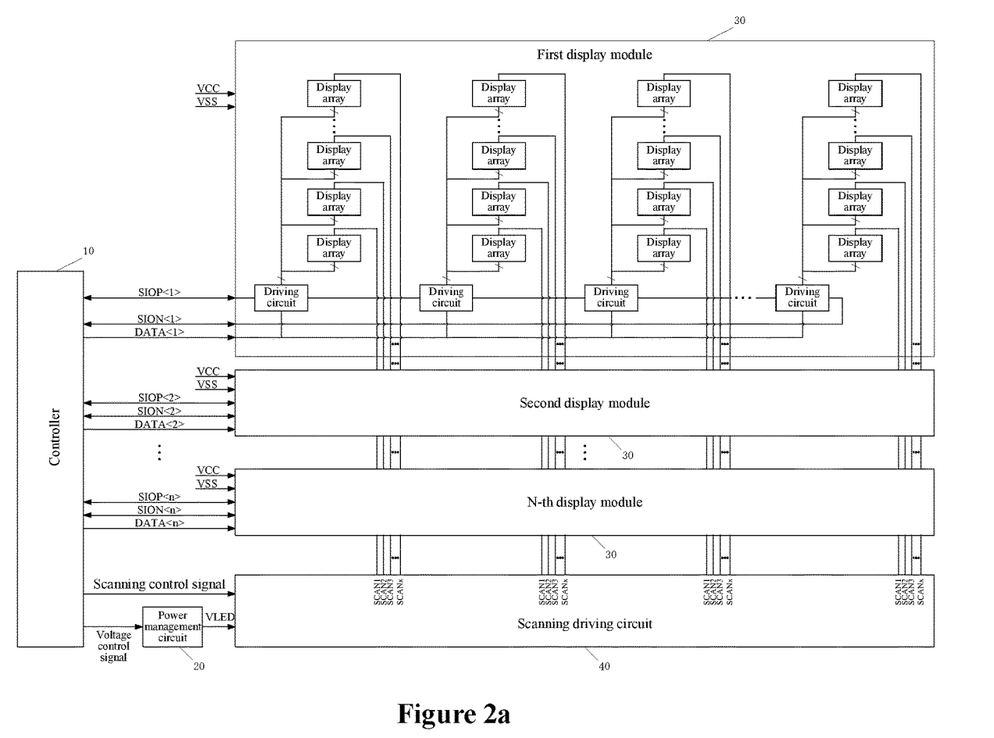
FIG. 2a is a schematic structural diagram of a display device according to another embodiment of the present disclosure.

As shown in FIG. 2a, in an embodiment of the present disclosure, the display device may further include multiple display arrays and a scanning driving circuit 40.

For each of driving circuits in each display module 30, the driving circuit is connected to K display arrays, and is configured to drive the K display arrays. K represents a positive integer greater than or equal to 2.

The scanning driving circuit 40 is connected to the power management circuit 20, the controller 10 and the respective display arrays, is configured to receive power from the power management circuit 20, determine a scanning timing sequence based on a scanning control signal outputted by the controller 10, and cyclically output the voltages specified by the voltage control signal through K output terminals in a sequence, so that the K display arrays connected to each of driving circuits may be cyclically supplied with power.

Compared with the embodiment as shown in FIG. 1, in the embodiment as shown in FIG. 2a, each driving circuit is connected to K display arrays, so that the driving circuit can drive the K display arrays, to reduce the number of the driving circuits. Similarly, each display array may include one or more LED indicator lights.

Figure 2B:
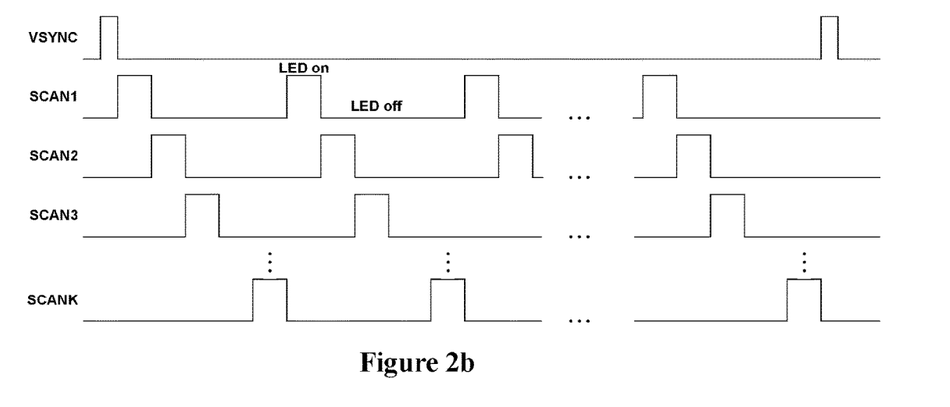
FIG. 2b is a schematic diagram of a scanning timing sequence according to an embodiment of the present disclosure.

In the embodiment, the controller 10 is required to provide the scanning control signal to the scanning driving circuit 40, and the scanning driving circuit 40 may determine the scanning timing sequence based on the scanning control signal outputted by the controller 10. For example, in an embodiment as shown in FIG. 2b, the scanning timing sequence is from SCAN1, SCAN2, . . . to SCANK. That is, in each cycle, the scanning driving circuit 40 outputs a voltage specified by the voltage control signal through a first output terminal, so that the first display array in the K display arrays driven by each of driving circuits is supplied with power by the scanning driving circuit 40; and then the scanning driving circuit 40 outputs a voltage specified by the voltage control signal through a second output terminal, so that a second display array in the K display arrays driven by each of driving circuits is supplied with power by the scanning driving circuit 40, and so on, finally the scanning driving circuit 40 outputs a voltage specified by the voltage control signal through a K-th output terminal, so that a K-th display array in the K display arrays driven by each of driving circuits is supplied with power by the scanning driving circuit 40. After this cycle is completed, the scanning driving circuit 40 outputs the voltage specified by the voltage control signal through the first output terminal again.

The scanning timing sequence may be determined through the scanning control signal. In the above embodiment, the scanning timing sequence is from SCAN1 to SCANK. In another scenario, the scanning timing sequence may be determined as required. It should be noted that the scanning timing sequence may specify a period of the cycle in addition to an order of the cycle. That is, a duration of LEDon and a duration of LEDoff in one timing sequence SCAN as shown in FIG. 2b may be determined by the scanning control signal.

Figure 3:
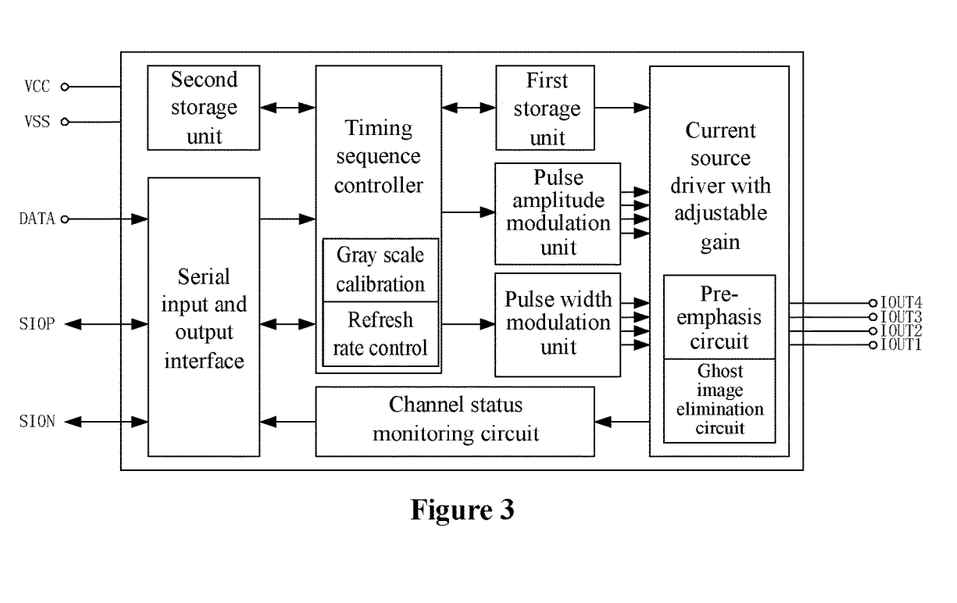
FIG. 3 is a schematic structural diagram of a driving device according to an embodiment of the present disclosure.

A structure of the driving circuit according to the present disclosure may be determined and adjusted according to the actual requirements, as long as the functions of the driving control and communication may be achieved through the driving circuit in the present disclosure. As shown in FIG. 3, in an embodiment of the present disclosure, each of the driving circuits includes a serial input and output interface, a timing sequence controller, a first storage unit, a second storage unit, a pulse amplitude modulation unit, a pulse width modulation unit, a current source driver with adjustable gain, and a channel status monitoring circuit.

The serial input and output interface is configured to connect serial control lines and a sharing data line, so that the controller 10 can address the driving circuit and read data of the driving circuit through the serial control lines, and the controller 10 can send information to the driving circuit through the sharing data line.

The timing sequence controller is connected to the serial input and output interface, and is configured to decode and deserialize data, store the decoded and deserialized display data in the first storage unit, and control outputs of the pulse amplitude modulation unit and the pulse width modulation unit through the data stored in the first storage unit, to control the respective indicator lights connected to the driving circuit.

The first storage unit is connected to the timing sequence controller, and is configured to store data.

The second storage unit is connected to the timing sequence controller, and is configured to store an address.

The pulse amplitude modulation unit is connected to the timing sequence controller, and is configured to output Y PAM signals under the control of the timing sequence controller.

The pulse width modulation unit is connected to the timing sequence controller, and is configured to output Y PWM signals under the control of the timing sequence controller.

The current source driver with an adjustable gain is connected to the pulse amplitude modulation unit and the pulse width modulation unit, and is configured to output Y current driving signals based on the Y PAM signals and the Y PWM signals to drive the display array connected to the driving circuit. A power of each of the current driving signals is controlled by one PAM signal and one PWM signal that correspond to the current driving signal.

The channel status monitoring circuit is configured to monitor circuit information of the respective Y current driving signals.

The serial input and output interface is required to be provided with two interfaces to connect the serial control lines, and one interface to connect the sharing data line. In the embodiment as shown in FIG. 3, Y is set to 4, that is, the current source driver with the adjustable gain may output four current driving signals. In addition, the interface of the driving circuit further includes a power terminal VCC and a ground terminal VSS. In the embodiment as shown in FIG. 3, the driving circuit is provided with nine external interfaces. The driving circuit may be designed as a micro-chip (uIC) to reduce the space occupation.

The controller 10 sends information to the driving circuit through the sharing data line DATA. Display data may be decoded and deserialized through the timing sequence controller, and then the decoded and deserialized display data is stored in the first storage unit. The outputs of the pulse amplitude modulation unit and the pulse width modulation unit changes with the display data. It should be noted that the current source driver with the adjustable gain is controlled by the Y PAM signals and Y PWM signals to output Y current driving signals, and the Y current driving signals are independent of each other. In the embodiment as shown in FIG. 3, Y is set to 4, that is, each display array may include four indicator lights which are respectively controlled by the four current driving signals, to adjust power of respective indicator lights.

In the solution as shown in FIG. 3, the current driving signal is controlled by the pulse amplitude modulation unit and the pulse width modulation unit, which has high flexibility.

In addition, the timing sequence controller in FIG. 3 further has functions of gray scale calibration and refresh rate control. The gray scale calibration may improve uniformity of the brightness of the display device, and the refresh rate control may adjust the refresh rate of the display device. The current source driver with the adjustable gain in FIG. 3 is further provided with a pre-emphasis circuit and a ghost image elimination circuit. The pre-emphasis circuit is configured to accelerate conduction of the channel, that is, reduce a time period of turning on the channel. The ghost image elimination circuit is configured to effectively eliminate influences of lines of current channels IOUT1 to IOUT4 and LED parasitic capacitance.

The channel status monitoring circuit may respectively monitor circuit information of the Y current driving signals. A content of the circuit information is set as required. For example, in a convenient way, a voltage drop of each of the current driving signals may be monitored and recorded, and the recorded circuit information may be sent back to the controller 10 by means of a read-back function of SIOP and SION.

In an embodiment of the present disclosure, the current source driver with the adjustable gain may be specifically configured to:
   determine a global setting of currents of Y current sources through a first current adjustment command, and determine respective currents of the Y current sources through Y second current adjustment commands to perform a current calibration; and
   output the Y current driving signals under the control of the Y PAM signals and the Y PWM signals, to drive the display arrays connected to the driving circuit, where the power of each of the current driving signals is controlled by one PAM signal and one PWM signal that correspond to the current driving signal.

Figure 4:
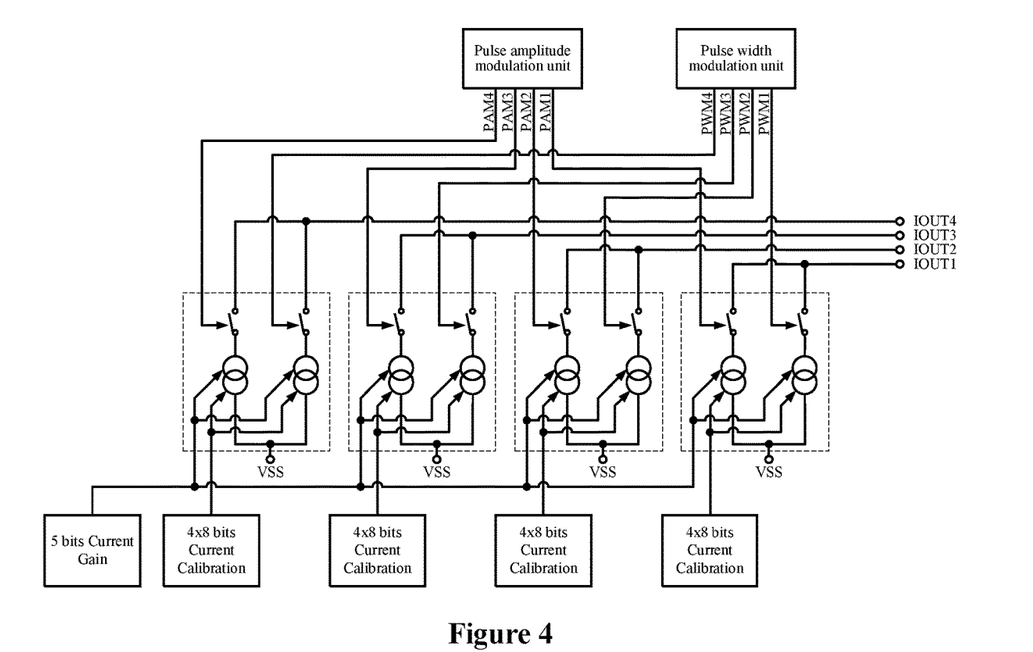
FIG. 4 is a schematic diagram showing a function that a current source driver with an adjustable gain determines a global setting of currents to achieve a current calibration according to an embodiment of the present disclosure.

Reference is made to FIG. 4. In FIG. 4, the first current adjustment command has bits, and is used to determine the global setting of currents of four current sources. The second current adjustment command has 4×8 bits, and is used to determine respective currents of the four current sources to achieve the current calibration, so as to improve accuracy of the current.

Figure 5:
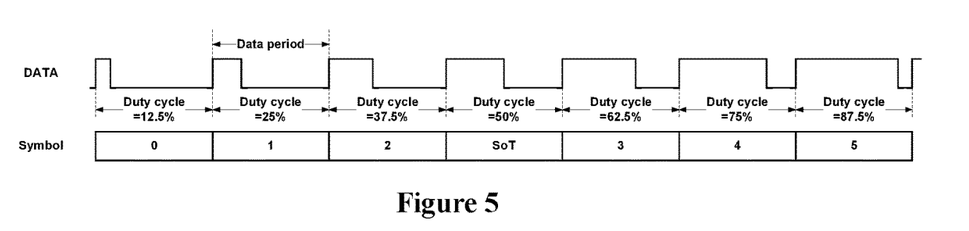
FIG. 5 is a schematic diagram showing duty cycle encoding according to an embodiment of the present disclosure.

As described above, data may be distinguished by different duty cycles on any one sharing data line according to the present disclosure. FIG. 5 is a schematic diagram showing duty cycle encoding according to an embodiment. In practices, DATA acquired by performing the duty cycle encoding may be transmitted into a periodic decoding circuit through a Schmidt trigger, to deserialize a serial bit stream with different duty cycles into a parallel data stream and store the parallel data stream into the first storage unit. The first storage unit is normally a register. In the embodiment as shown in FIG. 5, duty cycles of 12.5%, 25%, 37.5%, 62.5%, 75% and 87.5% are respectively defined as six symbols that are a symbol 0, a symbol 1, a symbol 2, a symbol 3, a symbol 4 and a symbol 5. A duty cycle of 50% is defined as a start of transmission (SoT) symbol, which is used to isolate data or commands. In the example as shown in FIG. 4, a data transmission rate I (unit: bps) may be expressed as: $I=S\times\log_2 A$, where S represents an operation frequency (unit: hz) of DATA, and A represents the number of symbols. In the case of six symbols, the data transmission rate is about 2.58 times of a frequency of DATA.

In an embodiment of the present disclosure, a type of information transmitted on any one sharing data line includes a data packet and a command packet. The data packet includes SoT, CID, DW and DATA. The command packet includes SoT, CID, CW and CMD.

Sot represents set data of start of transmission, CID represents an identity of an object specified by a packet, CW represents a set command flag, DW represents a set data flag, CMD represents command content of the command packet, and DATA represents data content of the data packet.

According to the solution of the present disclosure, information is transmitted through the sharing data lines, and a communication protocol may be set as required. In the embodiment, structures of the data packet and the command packet are relatively simple, which is beneficial to improving the efficiency of information transmission.

It should also be noted that the data packet includes SoT, CID, DW and DATA, and an order of CID, DW and DATA in the data packet is not limited in the present disclosure. Similarly, an order of CID, CW and CMD in the command packet is not limited in the present disclosure.

Objects of both the data packet and the command packet are specified through the chip identity (CID). That is, a driving circuit compares the CID with an address of the driving circuit after detecting the SoT. If a CID comparison result indicates that the CID is the same as the address of the driving circuit, the command content CMD of the command packet is stored in a corresponding register based on the received CW (command write), or the data content DATA of the data packet is stored in a corresponding register based on the DW (data write). If the CID comparison result indicates that the CID is different from the address of the driving circuit, the object of the packet is not this driving circuit, and the current packet may be ignored.

Figure 6:
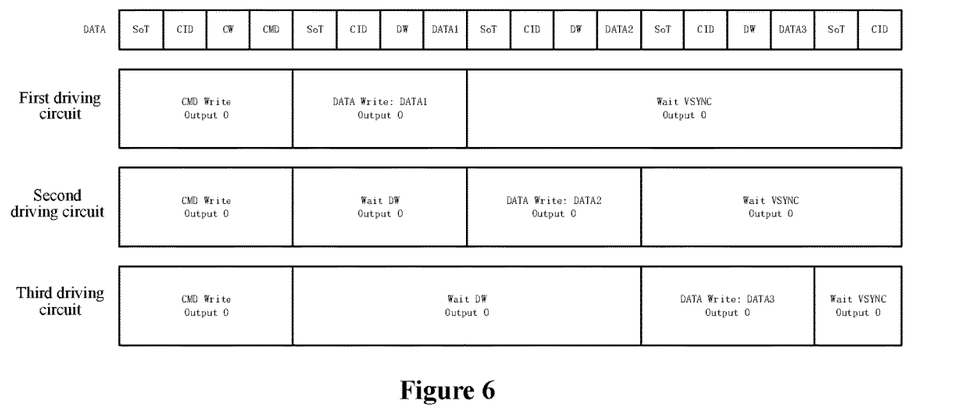
FIG. 6 is a schematic diagram showing a data packet and a command packet in a predetermined format according to an embodiment of the present disclosure.

In an embodiment as shown in FIG. 6, the command packet is allowed to simultaneously perform a writing operation on all driving circuits without waiting for a VSYNC signal. That is, a special CID may be set for some commands, so that such command packet may be simultaneously written into the all driving circuits.

In the example as shown in FIG. 6, an object of data DATA1 is a first driving circuit, that is, the data DATA1 is required to be written into the first driving circuit. After the data DATA1 is written into the first driving circuit, the first driving circuit may wait for the VSYNC signal and output zero. Here, the outputted zero indicates that no display data is stored in the first storage unit of the first driving circuit before the data DATA1 is written into the first driving circuit. It can be understood that in response to a reception of the VSYNC signal, an output control may be performed according to the DATA1 stored in the first storage unit, that is, the current driving signals is controlled to be output according to the DATA1. That is, every time the VSYNC signal is received, the first driving circuit updates the outputted current drive signals according to the content stored in the first storage unit.

Correspondingly, in the example as shown in FIG. 6, when the data DATA1 is written into the first driving circuit, the remaining M−1 driving circuits are in a wait-to-write status. For example, if an object of a next data packet is the second driving circuit, data DATA2 is written into the second driving circuit.

In an embodiment of the present disclosure, when the controller read data of M driving circuits in each of the display modules 30 through the serial control lines corresponding to the display module, the controller is specifically configured to: for each of the display modules 30, read data of the M driving circuits in the display module 30 through the serial control lines corresponding to the display module 30, in an order of the first driving circuit to the M-th driving circuit in the display module 30 or in an order of the M-th driving circuit to the first driving circuit in the display module 30, in the case that a data reading command is written to the sharing data line corresponding to the display module 30.

Figure 7A:
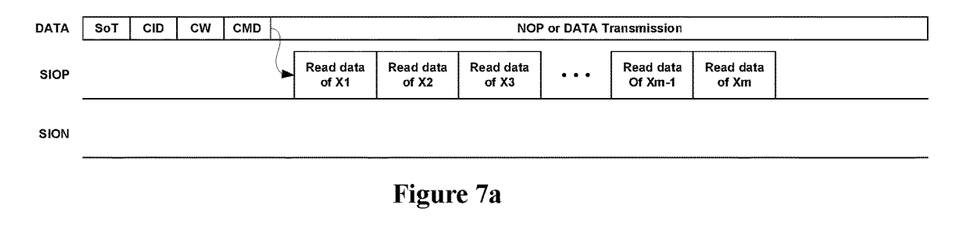
FIG. 7a is a schematic diagram showing a timing sequence for reading back by SIOP according to an embodiment of the present disclosure.

The controller 10 performs the read-back function through SIOP or SION. As shown in FIG. 7a, when the controller 10 performs the read-back function through SIOP, the controller 10 writes the data reading command into a sharing data line corresponding to a designated display module 30. Then the first driving circuit sends data in the first driving circuit to the controller 10 through the sharing data line. At the same time, the second driving circuit sends data in the second driving circuit to the first driving circuit through the sharing data line, and the third driving circuit sends data in the third driving circuit to the second driving circuit through the sharing data line, and so on. Finally, the controller 10 may successively read the data sent by the first driving circuit to the M-th driving circuit through the sharing data line.

Figure 7B:
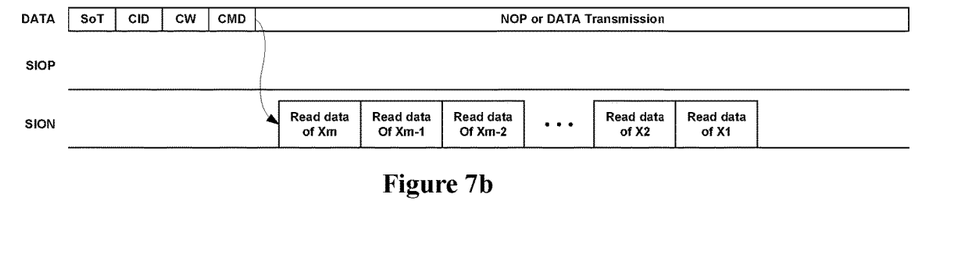
FIG. 7b is a schematic diagram showing a timing sequence for reading back by SION according to an embodiment of the present disclosure.

As shown in FIG. 7b, when the controller 10 performs the read-back function through SION, the controller 10 may read the data sent by the M-th driving circuit to the first driving circuit successively through the sharing data line.

In FIGS. 7a and 7b and FIGS. 8a and 8b, X1 to Xm respectively represent the first driving circuit to the M-th driving circuit in each of the display modules 30. In addition, the controller is allowed to performs the read-back function when the driving circuit is transmitting data or in a no operation performed (NOP) status.

In an embodiment of the present disclosure, when the controller 10 addresses M driving circuits in each of the display modules 30 through the serial control lines corresponding to the display module, the controller is specifically configured to:

for each of the display modules 30, address the M driving circuits in the display module 30, in the order of the first driving circuit to the M-th driving circuit in the display module 30 or in the order of the M-th driving circuit to the first driving circuit in the display module 30; and for each of the driving circuits, determine an address carried in an address packet as an address assigned for the driving circuit and store the address, when the driving circuit receives a pulse signal through a serial control line connected to the driving circuit and receives the address packet through a sharing data line connected to the driving circuit.

The address packet includes a packet header in a predetermined format and the address.

Figure 8A:
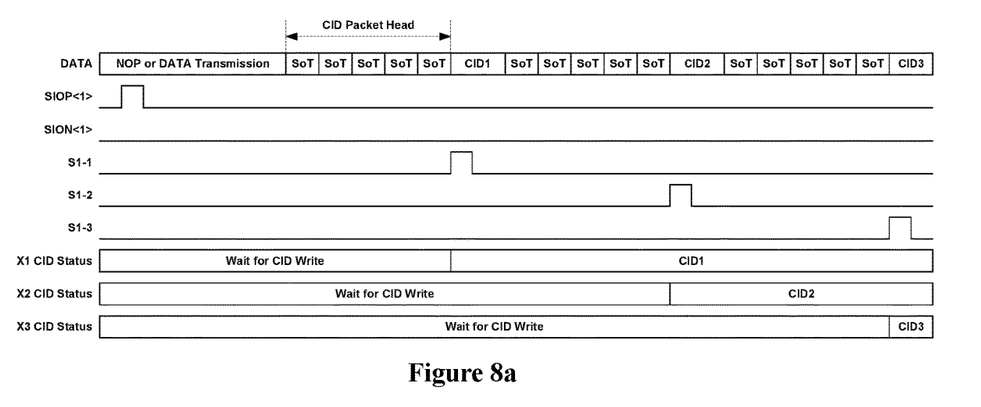
FIG. 8a is a schematic diagram showing a first timing sequence for addressing all driving circuits in a display module according to an embodiment of the present disclosure.

Reference is made to FIG. 8a, which is a schematic diagram showing a timing sequence for addressing respective driving circuits in a display module 30 according to an embodiment. In FIG. 8a, the packet header of the address packet in the predetermined format is five SoTs. In another embodiment, the packet header may be in other forms.

Taking the first display module 30 as an example, in the embodiment as shown in FIG. 8a, the first driving circuit receives the pulse signal sent by the controller 10 through SIOP<1>, and then receives five SoTs and CID1 on the sharing data line. The first driving circuit writes CID1 into the second storage unit of the first driving circuit, and CID1 serves as an address assigned by the controller 10 for the first driving circuit. Correspondingly, after the address of the first driving circuit is assigned, the first driving circuit sends a pulse signal to the second driving circuit through S11. Then, when the second driving circuit receives five SoTs and CID2 sent by the controller 10 on the sharing data line, the second driving circuit writes CID2 into the second storage unit of the second driving circuit, and CID2 serves as an address assigned by the controller 10 for the second driving circuit. The similar addressing processes are performed until the M driving circuits are addressed.

In addition, it should be noted that when a driving circuit is addressed and the next driving circuit does not receive the address packet sent by the controller 10, the next driving circuit waits until receiving the address packet. That is, in the solution of the present disclosure, a time interval is allowed to be in the addressing process.

Figure 8B:
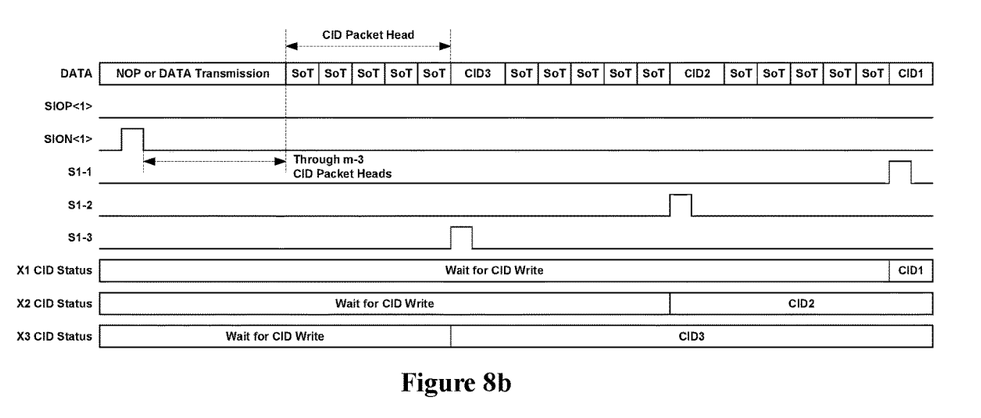
FIG. 8b is a schematic diagram showing a second timing sequence for addressing all driving circuits in a display module according to an embodiment of the present disclosure.

In an embodiment as shown in FIG. 8b, the M-th driving circuit receives the pulse signal sent by the controller 10 through the SION<1>, and then receives five SoTs and CID1 on the sharing data line. The M-th driving circuit writes CID1 into the second storage unit of the M-th driving circuit, and CID1 serves as an address allocated by the controller 10 for the M-th driving circuit. The similar addressing processes are performed until the M driving circuits are all addressed.

It can be seen that in the embodiment as shown in FIG. 8a, the addressing process starts from a driving circuit closest to the controller 10, and a driving circuit farthest from the controller 10 is finally addressed. In the embodiment as shown in FIG. 8b, the addressing process is performed from the driving circuit farthest from the controller 10 to the driving circuit closest to the controller 10.

In an embodiment of the present disclosure, the controller 10 is further configured to: read circuit information monitored by respective channel status monitoring circuits, and adjust an output voltage of the power management circuit 20 to a minimum power supply voltage required by the respective display arrays.

In the embodiment, the read circuit information monitored by the respective channel status monitoring circuits may be voltage information. In another embodiment, the circuit information may be other types of information. After the circuit information is read, the controller 10 may analyze the data to adjust the output voltage of the power management circuit 20. In practices, the value of the VLED may be adjusted to an appropriate value through multiple numbers of the adjustments.

It can be understood that the efficiency of the display device is improved with the reduction of the output voltage of the power management circuit 20. However, when the output voltage of the power management circuit 20 is too low, the LED indicator light cannot be turned on. Therefore, in the embodiment, the output voltage of the power management circuit 20 is adjusted to the minimum power supply voltage required by the respective display arrays, so as to maximize efficiency.

In practices, the controller 10 may further be configured to: adjust monitoring modes of the respective channel status monitoring circuits through a monitoring mode adjusting command, where an adjustable item in the monitoring mode includes a first adjustable item for indicating monitoring of a trigger time, where the monitoring of the trigger time includes: periodic monitoring, monitoring on receipt of a monitoring command, and monitoring when the monitoring command is received and the display device is in a standby status; a second adjustable item for indicating a duration in which monitoring is performed once; and a third adjustable item for indicating a selection of the monitored circuit.

Figure 9A:
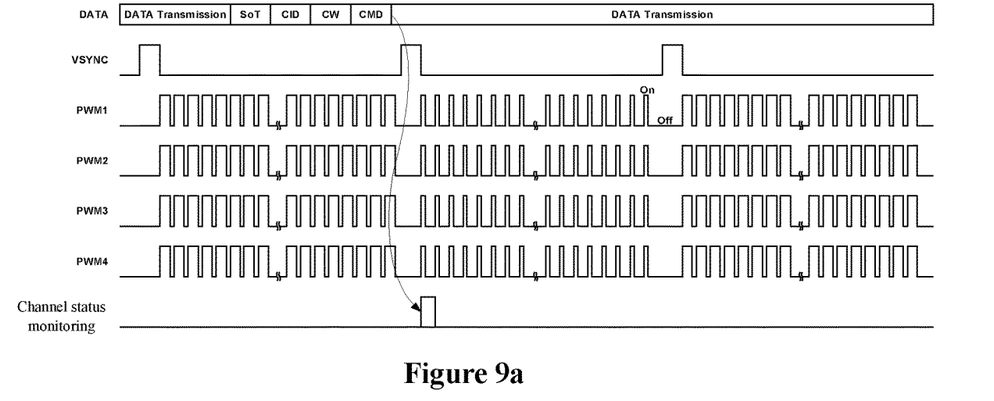
FIG. 9a is a schematic diagram showing a timing sequence of monitoring on receipt of a monitoring command according to an embodiment of the present disclosure.
Figure 9B:
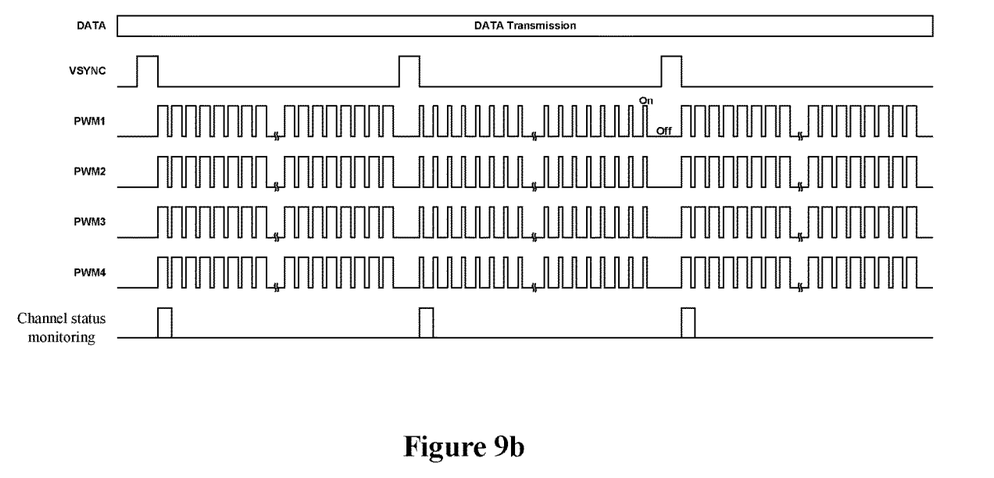
FIG. 9b is a schematic diagram showing a timing sequence of periodic monitoring according to an embodiment of the present disclosure.

For the first adjustable item for indicating monitoring of the trigger time, in the case that periodic monitoring is selected, the channel status monitoring circuit periodically monitors the circuit information after the display device is in a normal operation status. In the case that monitoring is performed on receipt of the monitoring command, if the controller 10 is required to read the circuit information monitored by respective channel status monitoring circuits, the controller 10 is required to send a command to make the channel status monitoring circuits monitor respective circuit information once, waits for a time period, for example, 2 frames, and then read the circuit information monitored by respective channel status monitoring circuits. For example, in an embodiment as shown in FIG. 9*a*, the monitoring is performed on receipt of the monitoring command. In an embodiment as shown in FIG. 9*b*, monitoring is periodically performed.

In the case that monitoring is performed when the monitoring command is received and the display device is in the standby status, the channel status monitoring circuits monitor the circuit information once when the monitoring command is received and the VSYNC signal is at a low level.

The second adjustable item controls the duration in which monitoring is performed once. In addition, in practices, as shown in FIG. 9*a* and FIG. 9*b*, the monitoring duration is set in units of a PWM interval. That is, the monitoring duration may be set as some times the PWM interval. The maximum duration may be determined as the number of PWM intervals in one frame. The third adjustable item may select the monitored circuit. For example, in the above example, there are IOUT1 to IOUT4, that is, a total of four selectable monitored circuits, and one or more circuits may be selected to be monitored as required.

Figure 10:
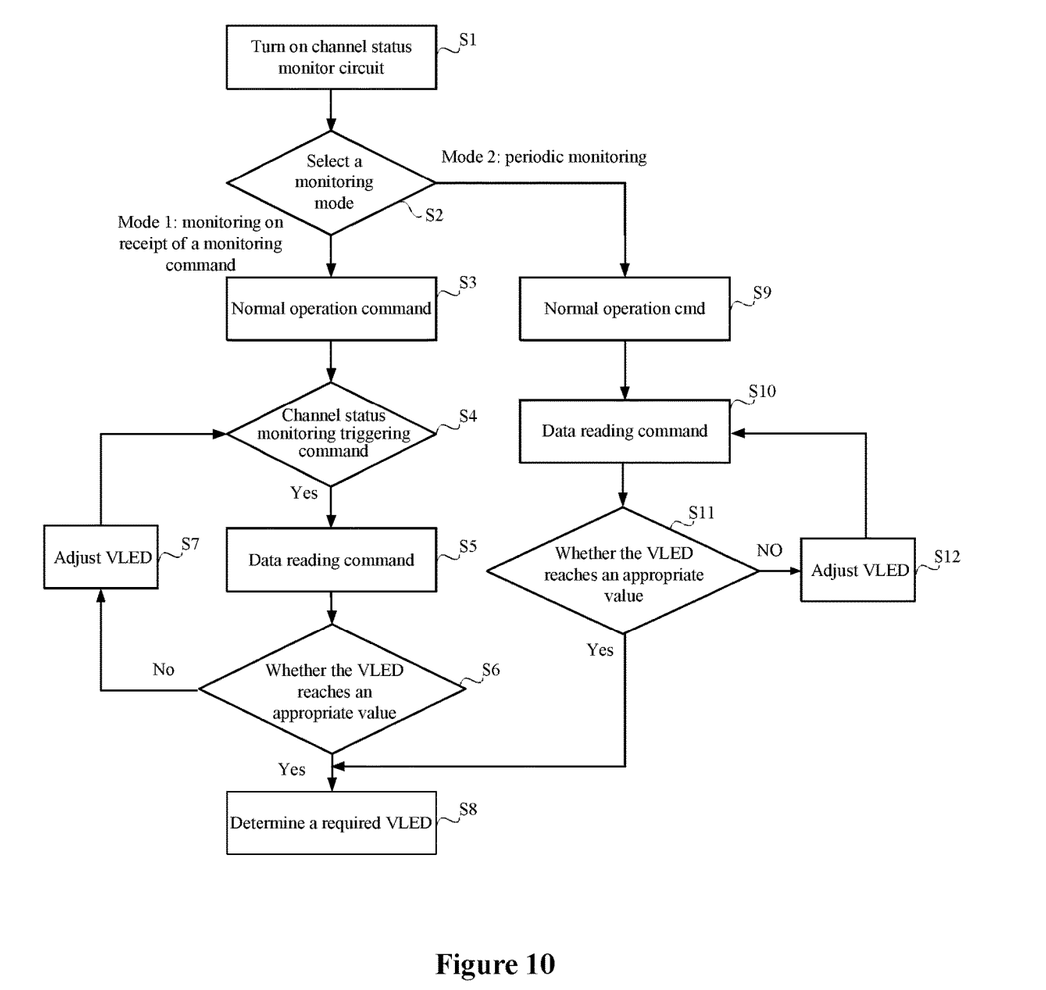
FIG. 10 is a flow chart showing adjusting VLED according to an embodiment of the present disclosure.

Reference is made to FIG. 10, which is a flow chart showing adjusting a VLED according to an embodiment. In the embodiment, after the display device starts, the controller performs the following steps S1 to S12. In step S1, the channel status monitoring circuit is turned on, and then the step S2 is performed. In step S2, the monitoring mode is selected, that is, a current monitoring mode is determined. In an embodiment, only two monitoring modes are predetermined. In the first monitoring mode, monitoring is performed on receipt of the monitoring command; and in the second monitoring mode, monitoring is performed periodically. In the case that the monitoring mode is determined as the first monitoring mode, step S3 is performed. In step S3, a normal operation command is issued, that is, the controller issues the normal operation command to make respective driving circuits in each of the display modules normally operate; and then step S4 is performed. In step S4, a channel status monitoring triggering command is issued, that is, the controller 10 issues the channel status monitoring triggering command as required. The channel status monitoring circuits may monitor respective circuit information once in response to the channel status monitoring triggering command. In step S5, a data reading command is sent. The controller 10 may read the circuit information monitored by the respective channel status monitoring circuits, by sending the data reading command. In step S6, it is determined whether the value of the VLED is an appropriate value. If the value of the VLED is the appropriate value, step S8 is performed. In step S8, a required value of the VLED is determined, that is, a current value of the VLED is the appropriate value, and the current value of the VLED is kept. If the value of the signal VLED is not the appropriate value, step S7 is performed. In step S7, the value of the VLED is adjusted. Through one or more times of the adjustment, the output voltage of the power management circuit 20 finally reaches the minimum power supply voltage required by the respective display arrays.

In the case that the monitoring mode is determined as the second monitoring mode, step S9 is performed. In step S9, the normal operation command is issued, that is, the controller issues the normal operation command to make respective driving circuits in each of the display modules normally operate. In step S10, the data reading command is sent. The controller 10 may read the circuit information monitored by the respective channel status monitoring circuits, by sending the data reading command. In step S11, it is determined whether the value of the VLED is an appropriate value. If the value of the VLED is the appropriate value, step S8 is performed. In step S8, a required value of the VLED is determined. If the value of the VLED is not the appropriate value, step S12 is performed. In step S12, the value of the VLED is adjusted. It can be seen that the first monitoring mode differs from the second monitoring mode is that the controller 10 is required to send the channel status monitoring triggering command to actively make the channel status monitoring circuits monitor the respective circuit information.

In an embodiment of the present disclosure, the controller 10 is further configured to:
  read circuit information monitored by the respective channel status monitoring circuits, and calibrate a brightness of the display device to obtain a brightness calibration result; and send information to the respective driving circuits in each of the display modules 30 through the sharing data line corresponding to the display module 30 based on the brightness calibration result, to calibrate brightness of respective indicator lights.

Similar to the monitoring mode of the channel status monitoring circuit described above, in the embodiment, when the brightness of the display device needs to be calibrated by using the circuit information monitored by the channel status monitoring circuits, each adjustable item in the monitoring mode may be set.

In the brightness calibration process, the brightness may be calibrated in a brightness calibration algorithm predetermined by the controller 10. The brightness calibration algorithm may be determined according to the actual requirements, for example, the brightness may be calibrated with a LUT function. After the brightness calibration result is acquired, the controller sends display data to each of the driving circuits, to calibrate the brightness of the respective indicator lights. Since the controller 10 acquires the circuit information monitored by the respective channel status monitoring circuits, to calibrate the brightness. Thus, the display device calibrates the brightness through channel monitoring and reading back, rather than conventional optical photography, which has a simple and convenient implementation process and a low cost.

Figure 11:
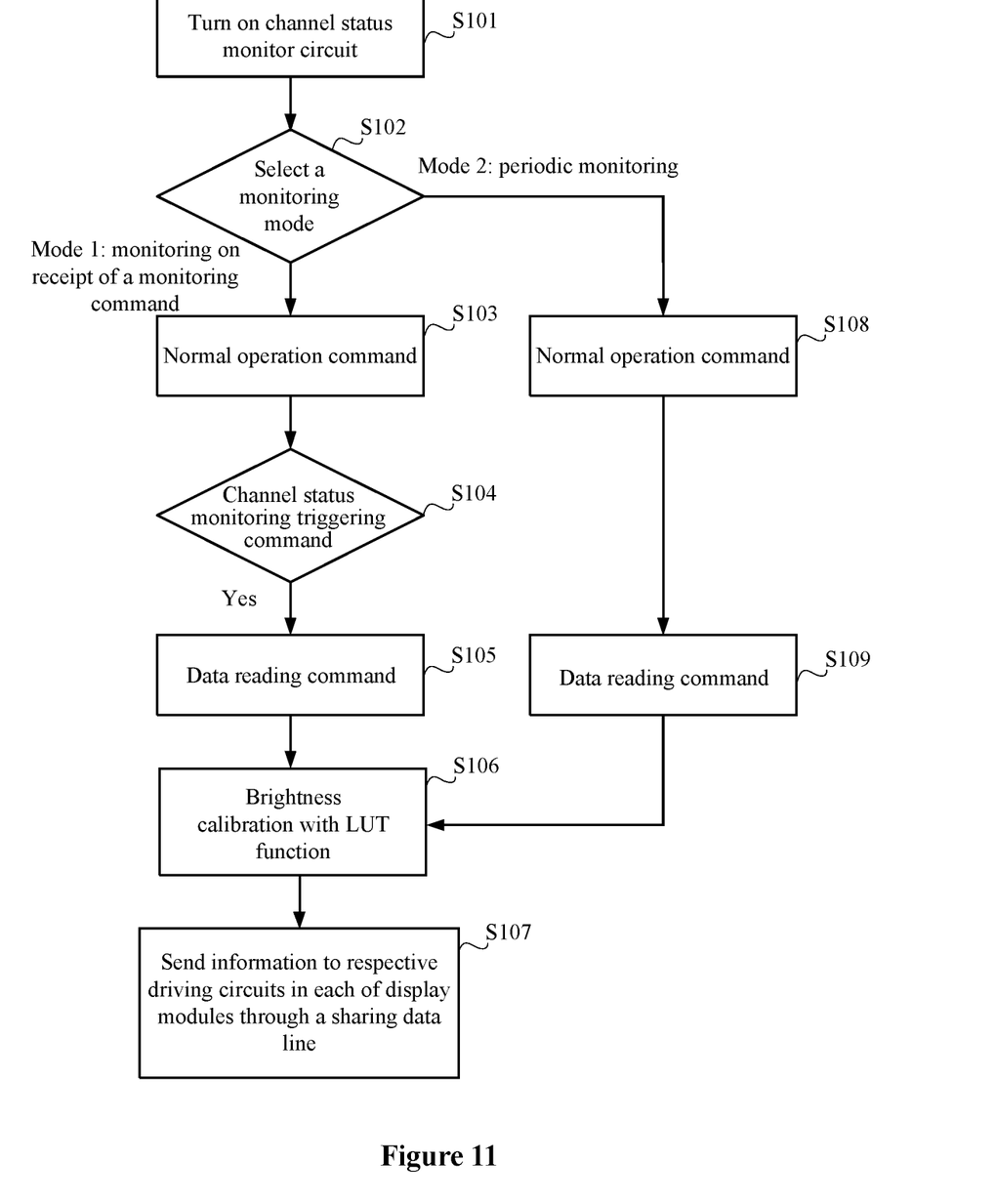
FIG. 11 is a flow chart showing brightness calibration according to an embodiment of the present disclosure.

Reference is made to FIG. 11, which is a flow chart showing brightness calibration according to an embodiment. In the embodiment, after the display device starts, the controller may perform the following steps S101 to S109. In step S101, the channel status monitoring circuit is turned on. In step S102, the monitoring mode is selected, that is, a current monitoring mode is determined. In the embodiment, only two monitoring modes are predetermined. In the first monitoring mode, monitoring is performed on receipt of the monitoring command; and in the second monitoring mode, monitoring is performed periodically. In the case that the monitoring mode is determined as the first monitoring mode, step S103 is performed. In step S103, a normal operation command is issued, that is, the controller 10 issues the normal operation command to make the respective driving circuits in each of the display modules normally operate; and then step S104 is performed. In step S104, a channel status monitoring triggering command is issued, that is, the controller 10 issues the channel status monitoring triggering command as required. The channel status monitoring circuits may monitor respective circuit information once in response to the channel status monitoring triggering command. In step S105, the data reading command is sent. The controller 10 may read the circuit information monitored by the respective channel status monitoring circuits by sending the data reading command. In step S106, a brightness calibration is performed through the LUT function. The controller 10 may acquire a brightness calibration result by the brightness calibration. Finally, in step S107, information is sent to the respective driving circuits in each of the display modules through the sharing data line corresponding to the display module, to calibrate brightness of the respective indicator lights. In the case that the monitoring mode is determined as the second monitoring mode, step S108 is performed. In step S108, the normal operation command is issued, and then step S109 is performed. In step S109, the data reading command is sent, that is, the controller 10 may read the circuit information monitored by the respective channel status monitoring circuits, by sending the data reading command.

In an embodiment, the controller 10 is further configured to: read the circuit information monitored by the respective channel status monitoring circuits and perform fault detection to acquire a fault detection result. The fault detection result may include a fault type, a fault location and other information, which can assist the worker in repairing the fault. In addition, in some cases, the display device may be restarted when a fault is detected, to eliminate some types of faults.

In an embodiment, the controller 10 is further configured to: send a low power consumption command to the respective driving circuits in each of the display modules 30 through the sharing data line corresponding to the display module 30, to set values of the current driving signals as zero. In the embodiment, the display device is allowed to be in a low power consumption mode, to ensure that the value of each of the current driving signals is zero, thereby effectively saving energy. In addition, in another embodiment, in the low power consumption mode, the value of each of the current driving signals may further be set as other small values, so that the brightness of the display device is at a low level.

According to the technical solutions of the embodiment of the present disclosure, the power management circuit 20 is connected to the controller 10 and the respective display arrays, and is configured to receive a voltage control signal sent by the controller 10 and output a voltage specified by the voltage control signal to each of the display arrays to supply power to each of the display arrays. Each of the display modules 30 includes: M driving circuits, and M display arrays respectively connected to the M driving circuits. Each of the M driving circuits is configured to drive a display array connected to the driving circuit. Each of the display arrays includes at least one indicator light. Therefore, according to the technical solutions of the present disclosure, a distributed display device can be achieved. The power management circuit may supply power to the respective display arrays under the control of the controller 10. For each of the display modules 30, M driving circuits in the display module 30 are cascaded through serial control lines corresponding to the display module 30. For each of the display modules 30, the controller 10 may address respective driving circuits in the display module 30 and read data of the respective driving circuits in the display module 30 through the serial control lines corresponding to the display module 30. Therefore, the addressing the driving circuits in the display device and reading data of the driving circuits in the display device can be easily achieved through the serial control lines, and the circuit design is simple. In the technical solutions of the present disclosure, when the controller 10 sends information to the respective driving circuits in each of the display modules 30 through the sharing data line corresponding to the display module 30, data is distinguished by different duty cycles on the sharing data line. Thus, only N sharing data lines are required to send information to N display modules 30, so that the circuit design is simple, and the complexity of the data transmission is reduced. In summary, the distributed display device can be effectively achieved according to the present disclosure, and complexities of circuit design and the data transmission of the display device are reduced.

It should be further noted that the relationship terminologies such as "first" and "second" in the present disclosure are only used herein to distinguish one entity or operation from another entity or operation, rather than to necessitate or imply that the actual relationship or order exists between the entities or operations. Moreover, terms of "include", "comprise" or any other variants are intended to be non-exclusive. Therefore, a process, method, article or device including multiple elements includes not only the elements but also other elements that are not enumerated, or also includes the elements inherent for the process, method, article or device. Unless expressively limited otherwise, the statement "comprising (including) one . . . " does not exclude the case that other similar elements may exist in the process, method, article or device.

It is to be further understood by those skilled in the art that units and algorithm steps described in combination with the embodiments of the present disclosure may be implemented by electronic hardware, computer software or a combination thereof. In order to clearly describe interchangeability of the hardware and the software, composition and steps are generally described above based on functions. Whether the functions are realized by the hardware or the software is determined by specific applications of the technical solutions and design constraints. For each of the specific applications, those skilled in the art may adopt a specific implementation to realize the functions described above, and the implementation should fall within the scope of the present disclosure.

Specific examples are used herein to explain the principle and embodiments of the present disclosure, and the above description of the embodiments is only used to facilitate understanding of the technical solutions and core concept of the present disclosure. It should be pointed out that for those skilled in the art, various improvements and modifications can be made without departing from the principle of the present disclosure, and these improvements and modifications should fall within the scope of protection of the present disclosure.

The invention claimed is:

1. A display device, comprising: a controller, a power management circuit and N display modules, wherein
each of the N display modules comprises M driving circuits, and M display array sets respectively connected to the M driving circuits, each of the M driving circuits is configured to drive a display array set connected to the driving circuit, and each of the display array sets comprises at least one display array, the display array comprises at least one indicator light, and M and N each represent a positive integer;
the power management circuit is connected to the controller and respective display array sets in the N display modules, and is configured to receive a voltage control signal sent by the controller and output a voltage determined by the voltage control signal to the display array sets to supply power to the display array sets;
for each of the N display modules, M driving circuits in the display module are cascaded through serial control lines corresponding to the display module, and connected to a corresponding IO port of the controller through the serial control lines; and the M driving circuits in the display module are connected to the controller through a sharing data line corresponding to the display module; and
the controller is configured to address the M driving circuits in each of the display modules and read data of the M driving circuits in each of the display modules, through the serial control lines corresponding to the display module, and send information to the driving circuits in the display module through the sharing data line corresponding to the display module, to control the driving circuits and the indicator light; and data is distinguished by different duty cycles on each sharing data line.

2. The display device according to claim 1, further comprising: a scanning driving circuit, wherein each of the display array sets comprises a plurality of display arrays, and
in each of the display modules, each of driving circuits is connected to K display arrays and is configured to drive the K display arrays, and K represents a positive integer greater than or equal to 2; and
the scanning driving circuit is connected to the power management circuit, the controller and the respective display arrays; and is configured to receive power from the power management circuit, determine a scanning timing sequence based on a scanning control signal outputted by the controller 10, and cyclically output the voltage determined by the voltage control signal through K output terminals in a sequence, to cyclically supply power to the K display arrays connected to each driving circuit.

3. The display device according to claim 1, wherein a type of information transmitted on each sharing data line comprises a data packet and a command packet, the data packet comprises SoT, CID, DW and DATA, and the command packet comprises SoT, CID, CW and CMD,
wherein SoT represents set data of start of transmission, CID represents an identity of an object specified by a packet, CW represents a set command flag, DW represents a set data flag, CMD represents command content of the command packet, and DATA represents data content of the data packet.

4. The display device according to claim 1, wherein when the controller is configured to read data of the M driving circuits in each of the display modules through the serial control lines corresponding to the display module, the controller is further configured to:
for each of the display modules, read data of the M driving circuits in the display module through the serial control lines corresponding to the display module, in an order of a first driving circuit to an M-th driving circuit in the display module or in an order of the M-th driving circuit to the first driving circuit in the display module, in a case that a data reading command is written into the sharing data line corresponding to the display module.

5. The display device according to claim 1, wherein when the controller is configured to address the M driving circuits in each of the display modules through the serial control lines corresponding to the display module, the controller is further configured to:
for each of the display modules, address the M driving circuits in the display module, in an order of a first driving circuit to an M-th driving circuit in the display module or in an order of the M-th driving circuit to the first driving circuit in the display module; and
for each of the driving circuits, determine an address carried in the address packet as an address assigned for the driving circuit and store the address, in a case that the driving circuit receives a pulse signal through a serial control line connected to the driving circuit and receives an address packet through a sharing data line connected to the driving circuit,
wherein the address packet comprises a packet header in a predetermined format and the address.

6. The display device according to claim 1, wherein each of the driving circuits comprises:
a serial input and output interface configured to connect the serial control lines and the sharing data line, wherein the controller addresses the driving circuit and reads data of the driving circuit through the serial control lines, and the controller sends information to the driving circuit through the sharing data line;

a timing sequence controller connected to the serial input and output interface, and configured to decode and deserialize data, store the decoded and deserialized data in a first storage unit; and control outputs of a pulse amplitude modulation unit and a pulse width modulation unit through the data stored in the first storage unit, to control the respective indicator lights connected to the driving circuit;

the first storage unit connected to the timing sequence controller, and configured to store data;

a second storage unit connected to the timing sequence controller, and configured to store an address;

the pulse amplitude modulation unit connected to the timing sequence controller, and configured to output Y PAM signals under a control of the timing sequence controller;

the pulse width modulation unit connected to the timing sequence controller, and configured to output Y PWM signals under a control of the timing sequence controller;

a current source driver with an adjustable gain, connected to the pulse amplitude modulation unit and the pulse width modulation unit, and configured to output Y current driving signals based on the Y PAM signals and the Y PWM signals to drive the display array set connected to the driving circuit, wherein a power of each of the current driving signals is controlled by one PAM signal and one PWM signal that correspond to the current driving signal; and a channel status monitoring circuit configured to monitor circuit information of respective Y current driving signals.

7. The display device according to claim 6, wherein the current source driver with adjustable gain is specifically configured to:

determine a global setting of currents of Y current sources through a first current adjustment command, and determine respective currents of the Y current sources through Y second current adjustment commands to perform a current calibration; and output the Y current driving signals under a control of the Y PAM signals and the Y PWM signals, to drive the display array set connected to the driving circuit, wherein the power of each of the current driving signals is controlled by one PAM signal and one PWM signal that correspond to the current driving signal.

8. The display device according to claim 6, wherein the controller is further configured to:

read circuit information monitored by respective channel status monitoring circuits, and adjust an output voltage of the power management circuit to a minimum power supply voltage required by the respective display array sets.

9. The display device according to claim 6, wherein the controller is further configured to:

adjust monitoring modes of respective channel status monitoring circuits through a monitoring mode adjusting command, wherein an adjustable item in the monitoring mode comprises a first adjustable item for indicating monitoring of a trigger time, wherein the monitoring of the trigger time comprises periodic monitoring, monitoring on receipt of a monitoring command, and monitoring when the monitoring command is received and the display device is in a standby status; a second adjustable item for indicating a duration in which the monitoring is performed once; and a third adjustable item for indicating a selection of a monitored circuit.

10. The display device according to claim 6, wherein the controller is further configured to:

read circuit information monitored by respective channel status monitoring circuits, and calibrate a brightness of the display device to obtain a brightness calibration result; and send information to the respective driving circuits in each of the display modules through the sharing data line corresponding to the display module based on the brightness calibration result, to calibrate brightness of the respective indicator lights.

11. The display device according to claim 6, wherein the controller is further configured to:

read circuit information monitored by respective channel status monitoring circuits, and perform fault detection to acquire a fault detection result.

12. The display device according to claim 6, wherein the controller is further configured to:

send a low power consumption command to the respective driving circuits in each of the display modules through the sharing data line corresponding to the display module, to set values of the current driving signals as zero.

* * * * *